United States Patent
Park et al.

(10) Patent No.: US 12,079,720 B2
(45) Date of Patent: Sep. 3, 2024

(54) APPARATUS AND METHOD FOR SCHEDULING DATA AUGMENTATION TECHNIQUE

(71) Applicant: SAMSUNG SDS CO., LTD., Seoul (KR)

(72) Inventors: Jeong Hyung Park, Seoul (KR); Seung Woo Nam, Seoul (KR); Ji Ah Yu, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 905 days.

(21) Appl. No.: 17/148,854

(22) Filed: Jan. 14, 2021

(65) Prior Publication Data

US 2022/0114441 A1 Apr. 14, 2022

(30) Foreign Application Priority Data

Oct. 14, 2020 (KR) ........................ 10-2020-0133036

(51) Int. Cl.
*G06N 3/08* (2023.01)
*G06N 3/045* (2023.01)
*G06N 5/022* (2023.01)
*G06N 7/01* (2023.01)

(52) U.S. Cl.
CPC ............... *G06N 3/08* (2013.01); *G06N 5/022* (2013.01); *G06N 3/045* (2023.01); *G06N 7/01* (2023.01)

(58) Field of Classification Search
CPC G06N 3/08; G06N 3/045; G06N 7/01; G06N 5/022
See application file for complete search history.

(56) References Cited

U.S. PATENT DOCUMENTS

2019/0354895 A1* 11/2019 Vasudevan ............ G06N 3/045
2021/0097348 A1* 4/2021 Shlens .................... G06N 3/08

FOREIGN PATENT DOCUMENTS

KR 10-2020-0068050 A 6/2020

OTHER PUBLICATIONS

Ho et al., "Population Based Augmentation: Efficient Learning of Augmentation Policy Schedules", Proceedings of the 36 th International Conference on Machine Learning, Long Beach, California, PMLR 97, 2019. (Year: 2019).*
Shorten et al., "A Survey on Image Data Augmentation for Deep Learning", Journal of Big Data. (Year: 2019).*
Lemley et al., "Smart Augmentation Learning an Optimal Data Augmentation Strategy", IEEE Access. (Year: 2017).*

* cited by examiner

*Primary Examiner* — Alan Chen
*Assistant Examiner* — Michael Joseph Guzniczak
(74) *Attorney, Agent, or Firm* — Sughrue Mion, PLLC

(57) ABSTRACT

An apparatus for scheduling a data augmentation technique according to an embodiment includes a data set extractor, a first trainer, an operation extractor, a second trainer, and a schedule determinator. The apparatus may provide a schedule for a data augmentation technique capable of improving the performance of a neural network classification model in a shorter time compared to the related art.

18 Claims, 10 Drawing Sheets

APPARATUS AND METHOD FOR SCHEDULING DATA AUGMENTATION TECHNIQUE

CROSS-REFERENCE TO RELATED APPLICATION(S)

This application claims the benefit under 35 USC § 119(a) of Korean Patent Application No. 10-2020-0133036, filed on Oct. 14, 2020, in the Korean Intellectual Property Office, the entire disclosure of which is incorporated herein by reference for all purposes.

BACKGROUND

1. Field

The disclosed embodiments relate to technology for scheduling a data augmentation technique.

2. Description of Related Art

Recently, with the exponential increase in computing power of a computing device, performance of a deep learning-based neural network classification model has been improved to an extent that surpasses that of humans, and is being utilized in various real-life fields.

However, there is a limit to the amount of data that can be actually collected while a vast amount of training data is needed to improve the performance of the neural network classification model, and thus various data augmentation techniques are emerging to generate more data by using limited data.

Accordingly, attempts are being made to perform data augmentation by applying different operations, magnitudes, and probabilities to previously collected data, and identifying which data augmentation technique can most effectively improve the performance of the neural network classification model is naturally emerging as a new task.

In this regard, several scheduling techniques have been developed so that various data augmentation techniques can be applied in a timely manner, but, at present, there is a limitation in that the time required for scheduling is too long and performance improvement of the neural network classification model after scheduling is weak.

SUMMARY

The disclosed embodiments are intended to provide a schedule for a data augmentation technique capable of improving the performance of a neural network classification model in a shorter time compared to the related art.

An apparatus for scheduling a data augmentation technique according to an embodiment disclosed includes a data set extractor that generates a reduced data set based on data distribution of a given training data set, a first trainer that trains each of a plurality of first neural network models reduced from a main model based on a data augmentation technique for each of a given plurality of operations and the reduced data set, an operation extractor that generates a reduced operation pool by extracting some operations from the plurality of operations based on performance of each of the trained models, a second trainer that trains each of a plurality of second neural network models having the same network structure as the first neural network model based on the data augmentation technique for each operation included in the reduced operation pool and the reduction data set, but performs iterative training while updating the data augmentation technique for each operation included in the reduced operation pool for each preset unit of training based on a training result of each of the plurality of second neural network models, and a schedule determinator that determines any one of update schedules of the data augmentation technique updated for each preset unit of training as an optimal schedule for the main model based on a final training result of each of the plurality of second neural network models.

The data set extractor may generate the reduced data set based on a ratio of data for each class constituting the given training data set.

The first trainer may include a first data augmenter that generates a plurality of augmented data sets by applying the data augmentation technique for each of the given plurality of operations to the reduced data set, respectively, and a first model trainer that trains each of the plurality of first neural network models with each of the generated plurality of augmented data sets.

The first data augmenter may apply the data augmentation technique for each of the given plurality of operations in which magnitude of the operation and probability of the operation are randomly updated for each preset unit of training to the reduced data set, respectively.

The operation extractor may identify some models having verification accuracy equal to or greater than a threshold value among the trained models, and extract an operation of a data augmentation technique applied when training the identified some models from the plurality of operations.

The second trainer may include a second data augmenter that generates a plurality of augmented data sets by applying the data augmentation technique for each operation included in the reduced operation pool to the reduction data set, respectively, a second model trainer that trains each of the plurality of second neural network models with each of the generated plurality of augmented data sets until being subjected to training a preset number of times, and an updater that updates the data augmentation technique for each operation included in the reduced operation pool based on verification accuracy of each of the plurality of second neural network models for the each preset unit of training until being subjected to training a preset number of times.

The updater may include a technique user that compares the verification accuracy of each of the plurality of second neural network models for the each preset unit of training, and determines the data augmentation technique applied to a model having the maximum verification accuracy as an optimal data augmentation technique to be used for the remaining models during next training, and a variable searcher that updates magnitude of the operation and probability of the operation of the determined optimal data augmentation technique based on a predefined probability density function.

The schedule determinator may compare verification accuracy of each of the plurality of second neural network models trained a preset number of times and determine, as the optimal schedule, an update schedule for the data augmentation technique applied to a model having a maximum verification accuracy while training is performed the preset number of times.

The optimal schedule may be an update schedule including an operation of the data augmentation technique applied to the model having the maximum verification accuracy for each preset unit of training, magnitude of the operation, and probability of the operation.

A method for scheduling a data augmentation technique according to an embodiment disclosed includes generating a reduced data set based on data distribution of a given training data set, training each of a plurality of first neural network models reduced from a main model based on a data augmentation technique for each of a given plurality of operations and the reduced data set, generating a reduced operation pool by extracting some operations from the plurality of operations based on performance of each of the trained models, training each of a plurality of second neural network models having the same network structure as the first neural network model based on the data augmentation technique for each operation included in the reduced operation pool and the reduction data set, but performing iterative training while updating the data augmentation technique for each operation included in the reduced operation pool for each preset unit of training based on a training result of each of the plurality of second neural network models, and determining any one of update schedules of the data augmentation technique updated for each preset unit of training as an optimal schedule for the main model based on a final training result of each of the plurality of second neural network models.

In the extracting, the reduced data set may be extracted based on a ratio of data for each class constituting the given training data set.

The training the each of the plurality of first neural network models may include generating a plurality of augmented data sets by applying the data augmentation technique for each of the given plurality of operations to the reduced data set, respectively, and training each of the plurality of first neural network models with each of the generated plurality of augmented data sets.

In the generating a plurality of augmented data sets, the data augmentation technique for each of the given plurality of operations in which magnitude of the operation and probability of the operation are randomly updated for each preset unit of training may be applied to the reduced data set.

In the generating the reduced operation pool, some models having verification accuracy equal to or greater than a threshold value among the trained models may be identified, and an operation of a data augmentation technique applied when training the identified some models may be extracted from the plurality of operations.

The performing the iterative training may include generating a plurality of augmented data sets by applying the data augmentation technique for each operation included in the reduced operation pool to the reduction data set, respectively, training each of the plurality of second neural network models with each of the generated plurality of augmented data sets, updating the data augmentation technique for each operation included in the reduced operation pool for the each preset unit of training based on verification accuracy of each of the plurality of second neural network models, and the training each of the plurality of second neural network models and the updating may be iteratively performed until being subjected to training a preset number of times.

The updating the data augmentation technique for each operation included in the reduced operation pool may include comparing the verification accuracy of each of the plurality of second neural network models for the each preset unit of training, and determining the data augmentation technique applied to a model having the maximum verification accuracy as an optimal data augmentation technique to be used for the remaining models during next training, and updating magnitude of the operation and probability of the operation of the determined optimal data augmentation technique based on a predefined probability density function.

In the determining, verification accuracy of each of the plurality of second neural network models trained a preset number of times may be compared and an update schedule for the data augmentation technique applied to a model having a maximum verification accuracy while training is performed the preset number of times may be determined as the optimal schedule.

The optimal schedule may be an update schedule including an operation of the data augmentation technique applied to the model having the maximum verification accuracy for each preset unit of training, magnitude of the operation, and probability of the operation.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Hereinafter, a specific embodiment will be described with reference to the drawings. The following detailed description is provided to aid in a comprehensive understanding of the methods, apparatus and/or systems described herein. However, this is only an example, and the disclosed embodiments are not limited thereto.

In describing the embodiments, when it is determined that a detailed description of related known technologies may unnecessarily obscure the subject matter of the disclosed embodiments, a detailed description thereof will be omitted.

In addition, terms to be described later are terms defined in consideration of functions in the disclosed embodiments, which may vary according to the intention or custom of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

Figure 1:
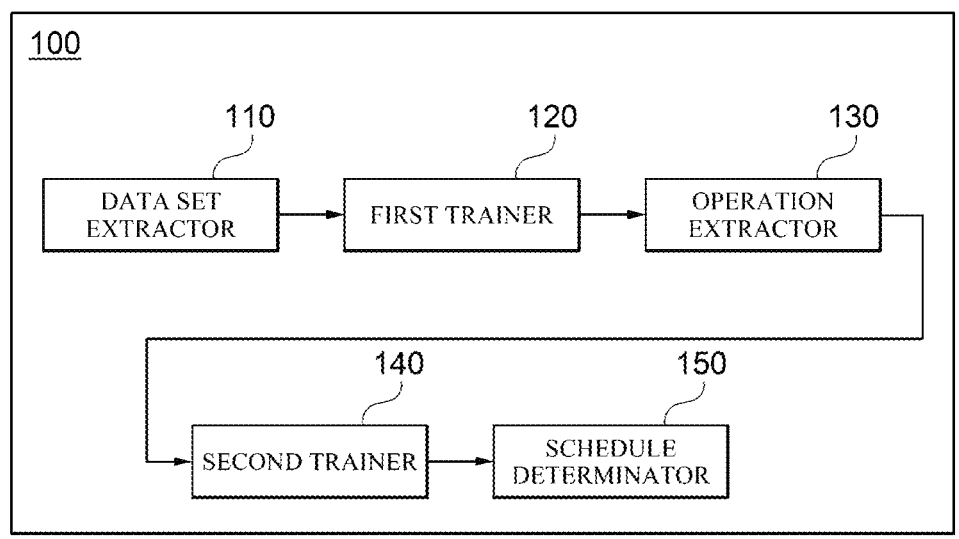
FIG. 1 is a block diagram for describing an apparatus for scheduling data augmentation technique according to an embodiment.

FIG. 1 is a block diagram for describing an apparatus 100 for scheduling a data augmentation technique according to an embodiment.

In the following, the term 'data augmentation' refers to all technology for generating more data by using limited data in order to sufficiently train a deep neural network-based model.

As illustrated, the apparatus 100 for scheduling the data augmentation technique according to an embodiment includes a data set extractor 110, a first trainer 120, an operation extractor 130, and a second trainer 140, and a schedule determinator 150.

The data set extractor 110 generates a reduced data set by extracting some data from a given training data set based on data distribution of the given training data set.

According to an embodiment, the data set extractor 110 may generate a reduced data set based on a ratio of data for each of a plurality of classes constituting the given training data set.

Specifically, the data set extractor 110 may generate the reduced data set through stratified sampling so that the ratio of data for each of a plurality of classes constituting a given training data set is maintained. For example, assume that a given training data set is composed of class 1, class 2, and class 3, and each class contains 10, 100, and 1000 piece of data in that order. In this case, the data set extractor 110 may generate the reduced data set by extracting one piece of data from class 1, 10 pieces of data from class 2, and 100 pieces of data from class 3 through the stratified sampling.

The first trainer 120 trains each of a plurality of first neural network models reduced from a main model based on a data augmentation technique for each of a given plurality of operations and the reduced data set.

In the following embodiments, the 'data augmentation technique' refers to a set of information on one or more parameters for data augmentation. Specifically, the data augmentation technique may include information on an operation used for data augmentation, a magnitude of the corresponding operation, and a probability that the corresponding operation will be applied.

In addition, in the following embodiments, the 'operation' means a function applied to data to be augmented. For example, the 'operation' may include a 'FlipLR' function that inverts the left and right of data, a 'FlipUD' function that inverts the top and bottom of data, an 'Invert' function that transposes a data array, a 'Rotate' function that rotates data by a preset angle, etc., but is not limited thereto.

In addition, in the following embodiments, the 'magnitude' of the operation means a variable that determines the degree to which the operation is applied to data. For example, some operations such as the 'FlipLR' function and 'FlipUD' have only the applied/not applied distinction without distinction of the magnitude, but in the case of the 'Rotate' function, an angle at which the data is rotated by a certain amount can be adjusted, and thus the "magnitude" will be a rotation angle of the data.

According to an embodiment, the magnitude of the operation may have a value of 0 or more and 9 or less.

In addition, in the following embodiments, the 'probability' of the operation may mean a probability that the operation is applied to data.

According to an embodiment, the probability of the operation may have a value of 0 or more and 1 or less.

According to an embodiment, the main model is a target to be trained according to the following optimal schedule, and the first neural network model may be an artificial neural network (ANN)-based model generated by simplifying a part of a structure of the main model.

That is, in other words, the main model and the first neural network model have a parent-child relationship, and the first neural network model may be generated by simplifying a network structure of the main model in order to reduce the time it takes to determine the optimal schedule. Accordingly, the main model may also be a model including an artificial neural network structure.

According to an embodiment, the first neural network model may include a convolutional neural network (CNN) structure.

The operation extractor 130 generates a reduced operation pool by extracting some operations from a plurality of operations based on the performance of each of the trained models.

Specifically, the performance of each of the trained models can be measured by calculating a validation accuracy by inputting a pre-prepared verification data set to the trained model.

According to an embodiment, the operation extractor 130 may identify some first neural network models having the verification accuracy equal to or greater than a threshold value among the trained first neural network models, and extract an operation of a data augmentation technique applied when training the identified first neural network model from a plurality of given operations.

Specifically, when each of the plurality of first neural network models is trained a preset number of times, the operation extractor 130 may sort the verification accuracy of each of the first neural network models in order of size, and extract only the operation of the data augmentation technique applied to the first neural network model having the verification accuracy equal to or greater than the threshold value.

For example, when the threshold value is 0.75, the operation extractor 130 may generate a reduction operation pool by extracting an operation applied to the model, by targeting only the models having the verification accuracy equal to or greater than 0.75 among a plurality of first neural network models that have been iteratively trained a preset number of times.

Meanwhile, according to an embodiment, the threshold value, which is a criterion for operation extraction, may be set based on a lower quantile (Q1) and an upper quantile (Q3) calculated from the distribution of verification accuracy of each of the trained first neural network models.

Specifically, the operation extractor 130 may calculate an inter quantile range (IQR) by subtracting the lower quantile from the upper quantile, and calculate a threshold value according to Equation 1 below.

$$\text{Threshold value} = Q1 - \tau * IQR \qquad \text{[Equation 1]}$$

In this case, Threshold value represents a threshold value, Q1 represents a lower quantile, and τ represents a coefficient preset for searching for statistical outliers.

According to an embodiment, τ may be a constant set in a range of 1.3 or more and 1.7 or less, but more preferably, τ may be set to 1.5.

The second trainer 140 trains each of a plurality of second neural network models having the same network structure as the first neural network model based on a data augmentation technique for each operation included in the reduced operation pool and the reduction data set, but performs iterative training while updating the data augmentation technique for each operation included in the reduced operation pool for each preset unit of training based on the training result of each of the plurality of second neural network models.

According to an embodiment, the second neural network model, like the first neural network model, may be a model generated by simplifying the main model.

That is, in other words, because the operation extractor 130 extracts some operations based on the result of training on the first neural network model performed by the first trainer 120, the second trainer 140 may also perform training on the second neural network model having the same network structure as the first neural network model so that appropriate training is performed by the extracted operation.

According to an embodiment, a preset unit of training means one epoch during which training is performed once for the entire reduced data set or for one batch selected by a preset batch number from the reduced data set. However, it should be noted that the unit of training does not necessarily mean one epoch, and may be set to two or more epochs depending on the embodiments.

According to an embodiment, the second trainer 140 may change at least one of a type of an operation, magnitude of the operation, and probability of the operation according to each data augmentation technique for each preset unit of training based on the verification accuracy of each of the plurality of second neural network models. In this regard, description will be made later with reference to FIGS. 3 and 4.

The schedule determinator 150 determines any one of the update schedules of the data augmentation technique updated for each preset unit of training as an optimal schedule for the main model based on the final training result of each of the plurality of second neural network models.

In the following embodiments, then 'update schedule' may mean information recorded about an operation of the augmentation technique applied to each second neural network model for each preset unit of training, while each of the plurality of second neural network models is iteratively trained.

Specifically, the 'update schedule' may be a text file recorded about the type of operation applied for data augmentation, the magnitude to which the operation was applied, and the probability that the operation was applied during training for each preset unit of training.

According to an embodiment, the schedule determinator 150 may compare the verification accuracy of each of the plurality of second neural network models trained a preset number of times and determine, as the optimal schedule, an update schedule for the data augmentation technique applied to a model having a maximum verification accuracy while training is performed the preset number of times.

Specifically, the optimal schedule may be an update schedule including an operation of the data augmentation technique applied to the model having the maximum verification accuracy for each preset unit of training, the magnitude of the operation, and the probability of the operation.

According to an embodiment, the schedule determinator 150 may provide the determined optimal schedule during training of the main model.

In the illustrated embodiment, each configuration may have different functions and capabilities in addition to those described below, and may include additional configurations in addition to those described below.

In addition, in an embodiment, the data set extractor 110, the first trainer 120, the operation extractor 130, the second trainer 140, and the schedule determinator 150 may be implemented using one or more physically separated devices, or may be implemented by one or more processors or a combination of one or more processors and software, and may not be clearly distinguished in specific operations unlike the illustrated example.

Figure 2:
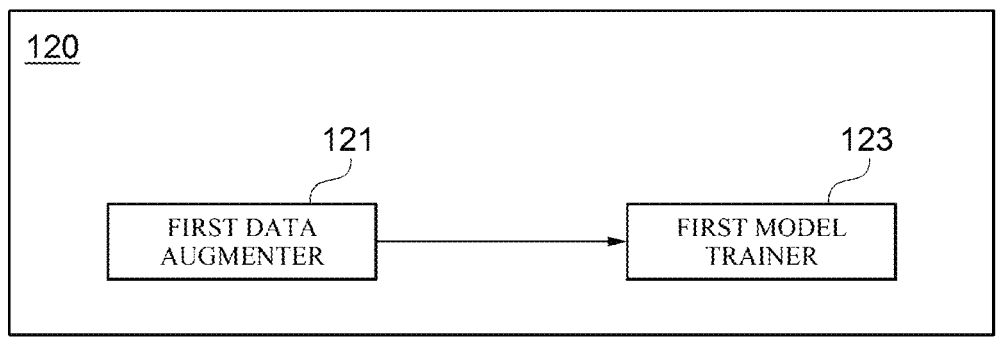
FIG. 2 is a block diagram for describing in more detail a first trainer according to an embodiment.

FIG. 2 is a block diagram for describing in more detail the first trainer 120 according to an embodiment.

As illustrated, the first trainer 120 according to an embodiment may include a first data augmenter 121 and a first model trainer 123.

The first data augmenter 121 may generate a plurality of augmented data sets by applying a data augmentation technique for each of a given plurality of operations to the reduced data set, respectively.

According to an embodiment, the first data augmenter 121 may generate a plurality of augmented data sets by applying the data augmentation technique in which the magnitude of the operation and the probability of the operation are randomly set for each of a plurality of given operations to the reduced data set.

Specifically, the first data augmenter 121 may apply the data augmentation technique for each of the given plurality of operations in which the magnitude of the operation and the probability of the operation are randomly updated for each preset unit of training to the reduced data set.

For example, in the data augmentation technique applied by the first data augmenter 121 to the reduced data set, the magnitude of the operation and the probability of the operation may be randomly updated every time one epoch elapses.

The first model trainer 123 may train each of the plurality of first neural network models with each of the plurality of augmented data sets generated by the first data augmenter 121.

Specifically, the first model trainer 123 may iteratively train each of the plurality of first neural network models a preset number of times.

In the illustrated embodiment, each configuration may have different functions and capabilities in addition to those described below, and may include additional configurations in addition to those described below.

In addition, in an embodiment, the first data augmenter 121 and the first model trainer 123 may be implemented using one or more physically separated devices, or may be implemented by one or more processors or a combination of one or more processors and software, and may not be clearly distinguished in specific operations unlike the illustrated example.

Figure 3:
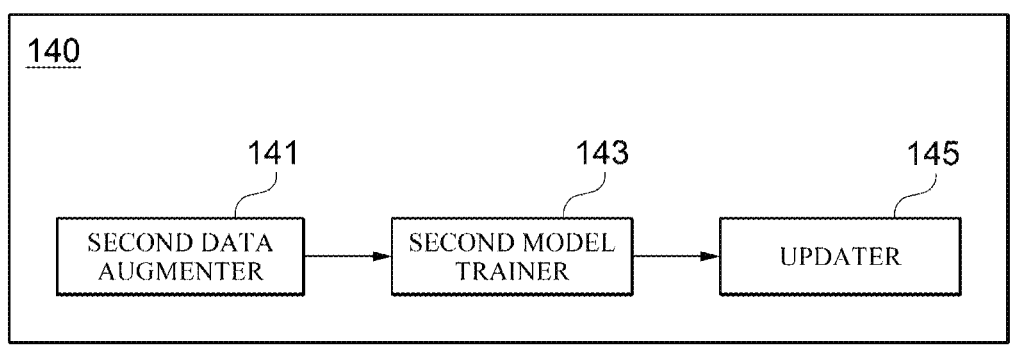
FIG. 3 is a block diagram for describing in more detail a second trainer according to an embodiment.

FIG. 3 is a block diagram for describing in more detail the second trainer 140 according to an embodiment.

As illustrated, the second trainer 140 according to an embodiment may include a second data augmenter 141, a second model trainer 143, and an updater 145.

The second data augmenter 141 may generate a plurality of augmented data sets by applying a data augmentation technique for each operation included in the reduced operation pool to each reduction data set.

The second model trainer 143 may train each of the plurality of second neural network models with each of the plurality of augmented data sets generated by the second data augmenter 141 until being subjected to training a preset number of times.

The updater 145 may update the data augmentation technique for each operation included in the reduced operation pool for each preset unit of training based on the verification accuracy of each of the plurality of second neural network models until being subjected to training a preset number of times.

In the illustrated embodiment, each configuration may have different functions and capabilities in addition to those described below, and may include additional configurations in addition to those described below.

In addition, in an embodiment, the second data augmenter 141, the second model trainer 143, and the updater 145 may be implemented using one or more physically separated devices, or may be implemented by one or more processors or a combination of one or more processors and software, and may not be clearly distinguished in specific operations unlike the illustrated example.

Figure 4:
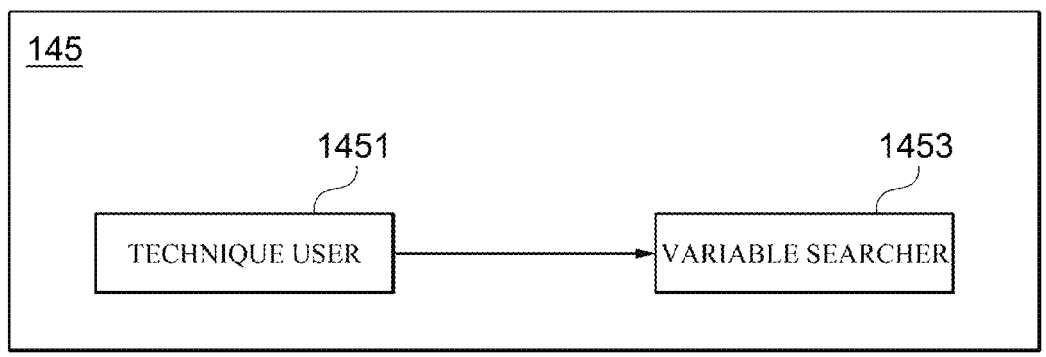
FIG. 4 is a block diagram for describing in more detail an updater according to an embodiment.

FIG. 4 is a block diagram for describing in more detail the updater 145 according to an embodiment.

As illustrated, the updater 145 according to an embodiment may include a technique user 1451 and a variable searcher 1453.

The technique user 1451 may compare the verification accuracy of each of the plurality of second neural network models for each preset unit of training, and determine the data augmentation technique applied to the model having the maximum verification accuracy as an optimal data augmentation technique to be used for the remaining models during the next training.

Specifically, the technique user 1451 may determine the type of operation, the magnitude of the operation, and the probability of the operation according to the data augmentation technique applied to the model having the maximum verification accuracy as an operation applied to the remaining models during the next training, the magnitude of the operation, and the probability of the operation.

For example, assume that, as a result of comparing the verification accuracy of each of the plurality of second neural network models by the technique user 1451 after the second epoch has elapsed, the 'Rotate' operation was applied to the model having the maximum verification accuracy with a magnitude of 5 and a probability of 0.6.

In this case, the technique user 1451 may determine a type of an operation to be applied to the remaining models in training in the third epoch as a 'Rotate' operation, and determine a magnitude of the operation as 5, and determine a probability of the operation as 0.6.

The variable searcher 1453 may update the magnitude of the operation and the probability of the operation of the optimal data augmentation technique determined by the technique user 1451 based on a predefined probability density function.

That is, the magnitude of the operation and the probability of the operation determined by the technique user 1451 are initial values to be applied to the remaining models during the next training, and the variable searcher 1453 may update the magnitude of the operation and the probability of the operation by determining an amount of change in the magnitude of the operation and an amount of change in the probability of the operation.

According to an embodiment, the variable searcher 1453 may calculate a parameter for the predefined probability density function based on the verification accuracy of each of the plurality of second neural network models, and extract an amount of change in the magnitude of the operation and an amount of change in the probability of the operation from the distribution of the probability density function determined by the calculated parameter.

According to an embodiment, the variable searcher 1453 may update the magnitude of the operation and the probability of the operation based on a beta distribution. In this case, since the beta distribution has only a sample value of 0 or more and 1 or less, a process of translating or scaling the sample value may be preceded in order to extract the amount of change in the magnitude of the operation and the amount of change in the probability of the operation.

According to an embodiment, the variable searcher 1453 may update the magnitude of the operation and the probability of the operation through the following process.

(1) At a point in time when a preset unit of training has elapsed, the verification accuracy of each of the plurality of second neural network models is compared, and the maximum verification accuracy is multiplied by a preset constant to calculate the upper extreme (UE).

In this case, a constant multiplied by the maximum verification accuracy may be 1.05.

(2) The lower quantile and the upper quantile are calculated from the verification accuracy of each of the plurality of second neural network models, and lower extreme (LE) is calculated according to Equation 2 below.

$$LE = Q1 - \tau * IQR \quad \text{[Equation 2]}$$

In this case, Q1 represents a value corresponding to the lower quantile among the verification accuracy of each of the second neural network models, and IQR represents a value obtained by subtracting Q1 from the value corresponding to the upper quantile among the verification accuracy of each of the second neural network models, τ represents a preset coefficient for searching for statistical outliers.

(3) Two parameters αt and βt of the beta distribution are calculated according to Equation 3 below.

$$\begin{cases} \alpha_t = \left(\frac{v_t - LE}{UE - LE}\right) * 10 \\ \beta_t = 10 - \alpha_t \end{cases} \quad \text{[Equation 3]}$$

In this case, $v_t$ represents the verification accuracy of each of the second neural network models.

The amount of change in the magnitude of the operation and the amount of change in the probability of the operation are extracted according to Equation 4 below.

$$\text{Beta distribution}(\alpha_t, \beta_t)\left(\frac{x+4}{8}\right) \quad \text{[Equation 4]}$$

In this case, x represents the amount of change in the intensity of the operation or the change in the probability of the operation That is, the variable searcher 1453 uses Equation 4 above separately in extracting the amount of change in the magnitude of the operation and the amount of change in the probability of the operation.

According to an embodiment, the variable searcher 1453 may extract the amount of change in the magnitude of the operation and the amount of change in the probability of the operation from an integer of −3 or more and 3 or less.

According to an embodiment, the variable searcher 1453 may update the magnitude of the operation or the probability of the operation by converting the amount of change in the extracted magnitude of the operation or the amount of change in the extracted probability of the operation to correspond to a value range of the magnitude of the operation or the probability of the operation.

In the illustrated embodiment, each configuration may have different functions and capabilities in addition to those described below, and may include additional configurations in addition to those described below.

In addition, in an embodiment, the technique user 1451 and the variable searcher 1453 may be implemented using one or more physically separated devices, or may be implemented by one or more processors or a combination of one or more processors and software, and may not be clearly distinguished in specific operations unlike the illustrated example.

Figure 5:
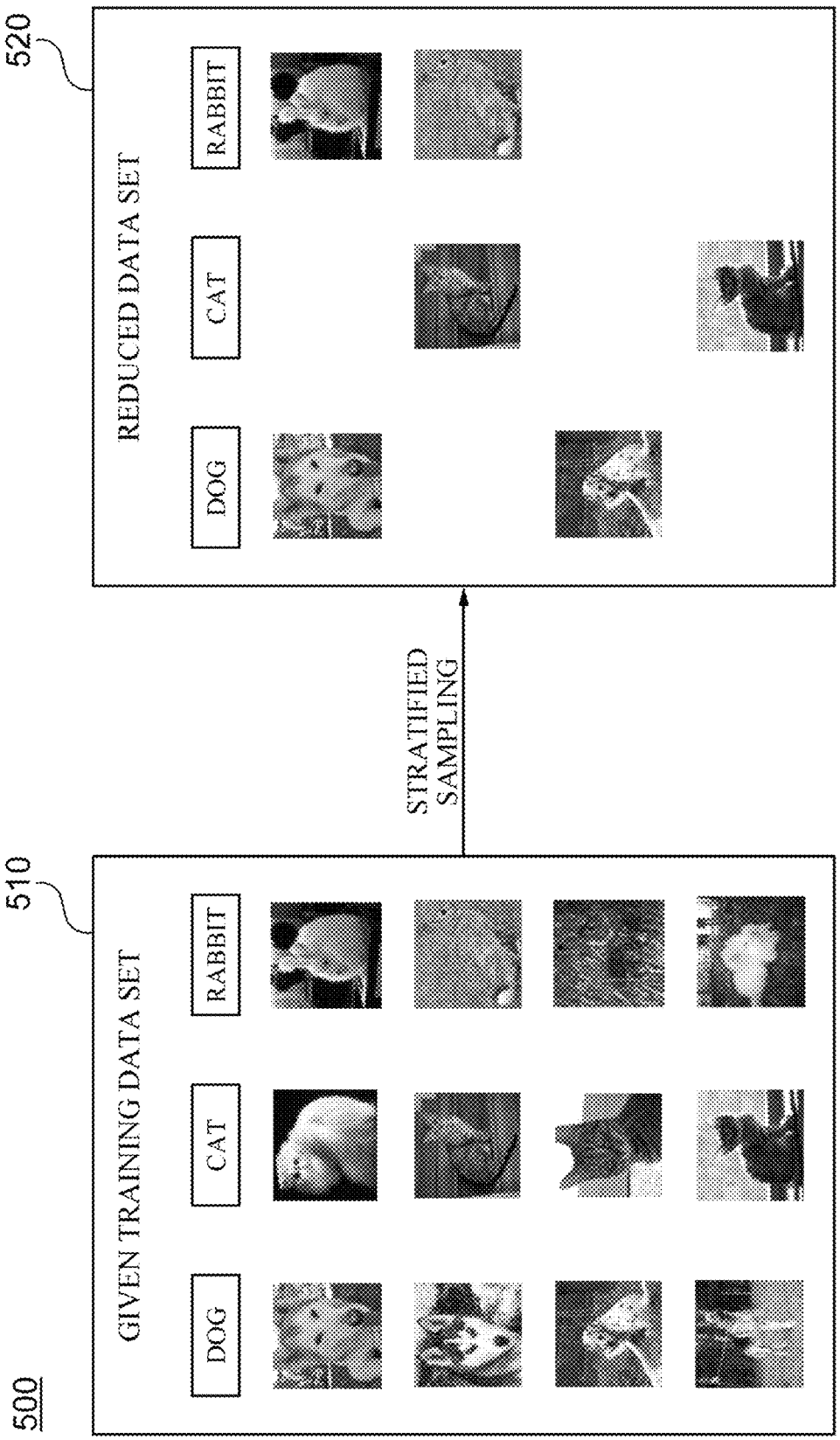
FIG. 5 is an exemplary view illustrating a process of generating a reduced data set according to an embodiment.

FIG. 5 is an exemplary diagram 500 illustrating a process of generating the reduced data set according to an embodiment.

Referring to FIG. 5, 12 pieces of data in a given training data set 510 are classified into 3 classes.

Specifically, among 12 pieces of data in the given training data set 510, 4 pieces of data are classified as a dog class, 4 pieces of data are classified as a cat classes, and 4 pieces of data are classified as a rabbit class.

In this case, since the reduced data set 520 generated by the data set extractor 110 is stratified while maintaining a ratio of data for each class, it can be seen that two pieces of data corresponding to each of the dog class, cat class, and rabbit class has been extracted.

Figure 6:
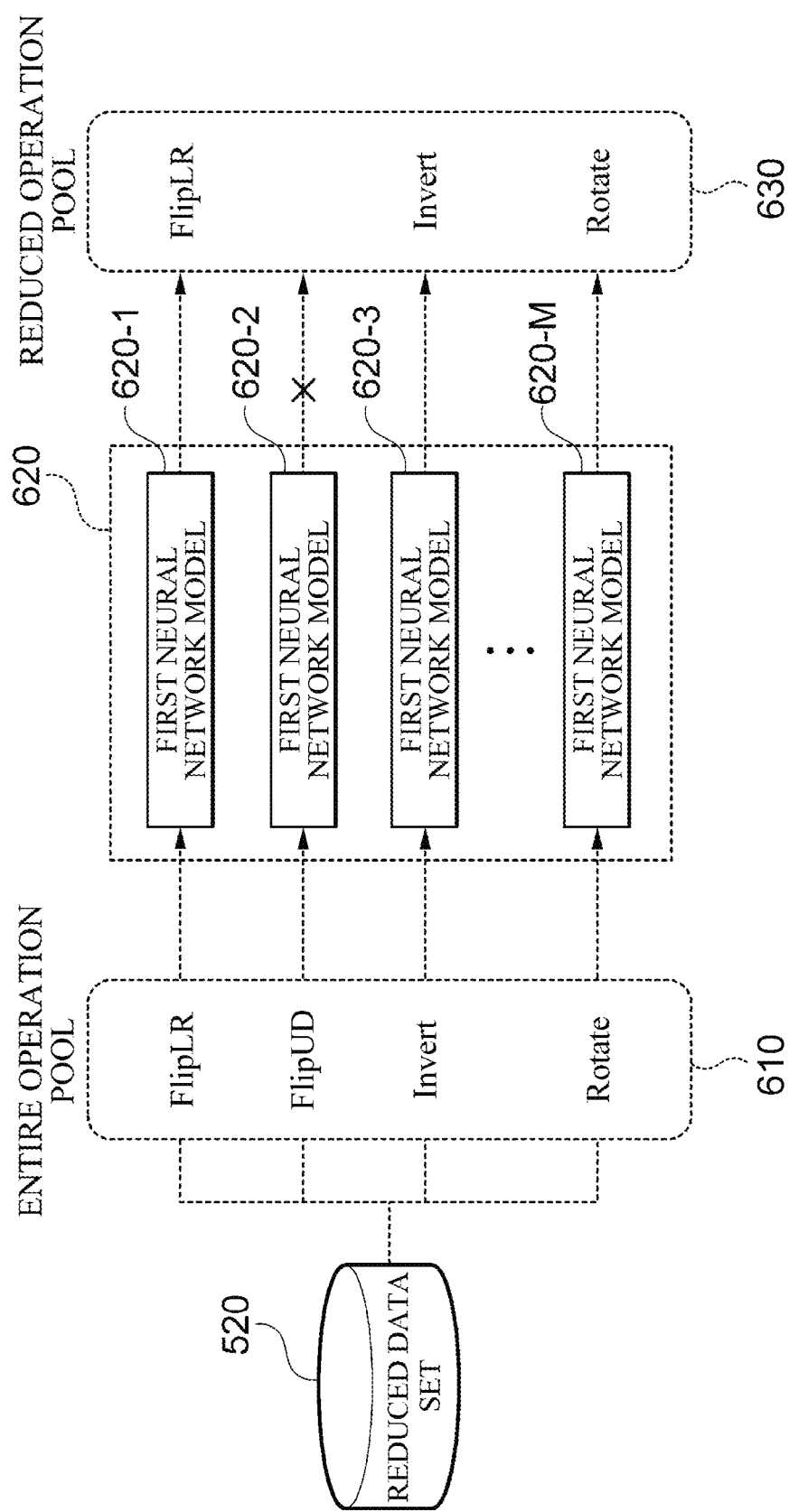
FIG. 6 is an exemplary diagram illustrating a process of training a first neural network model and a process of generating a reduced operation pool according to an embodiment.

FIG. 6 is an exemplary diagram 600 illustrating a process of training the first neural network model and a process of generating the reduced operation pool according to an embodiment.

Referring to FIG. 6, first, the first data augmenter 121 in the first trainer 120 augments data by applying the data augmentation technique using 'FlipUR', 'FlipUD', 'Invert', and 'Rotate' operations included in an entire operation pool 610 to the reduced data set 520.

Thereafter, the first model trainer 123 trains each of the plurality of first neural network models 620 with data augmented using each operation.

Specifically, the first model trainer 123 trains a first neural network model 620-1 with data augmented using the 'FlipUR' operation, trains a second first neural network model 620-2 with data augmented using the 'FlipUD' operation, trains a third first neural network model 620-3 with data augmented using the 'Invert' operation, and trains an M-th first neural network model 620-M with data augmented using the 'Rotate' operation.

As a result, the operation extractor 130 compares the verification accuracy of each of the trained first neural network models, excludes the 'FlipUD' operation applied to training of the second first neural network model 620-2 whose verification accuracy is less than the threshold value from the entire operation pool 610, and extracts the remaining three operations to generate a reduced operation pool 630.

Figure 7:
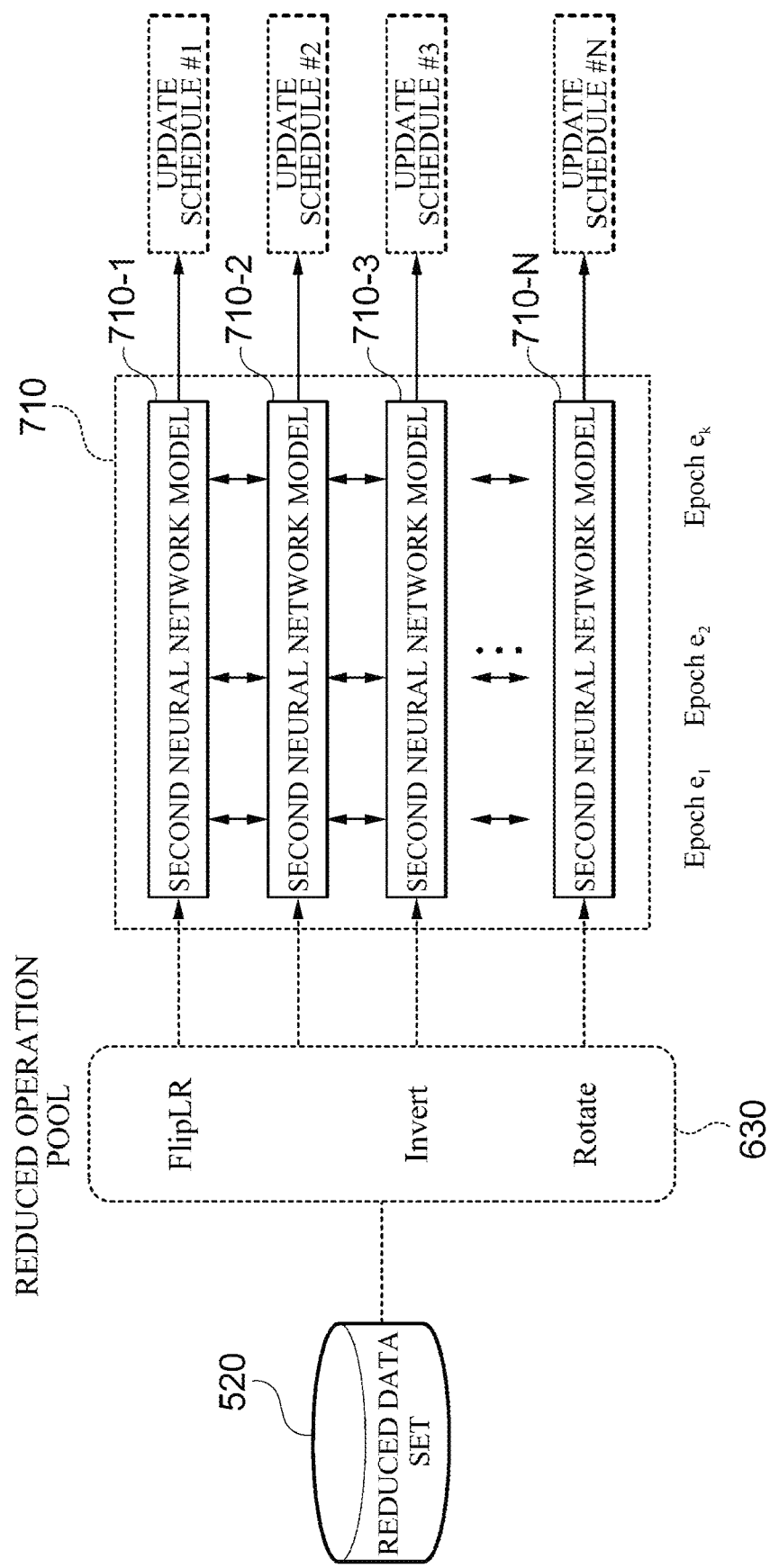
FIG. 7 is an exemplary view illustrating a process of training a second neural network model and a process of determining an optimal schedule according to an embodiment.

FIG. 7 is an exemplary diagram 700 illustrating a process of training the second neural network model and a process of determining the optimal schedule according to an embodiment.

Referring to FIG. 7, first, the second data augmenter 141 in the second trainer 140 augments data by applying the data augmentation technique using 'FlipUR', 'Invert', and 'Rotate' operations included in the reduced entire operation pool 630 to the reduced data set 520.

Thereafter, the second model trainer 143 trains each of a plurality of second neural network models 710 with data augmented using each operation.

Specifically, the second model trainer 143 trains a first second neural network model 710-1 with data augmented using the 'FlipUR' operation, trains a third second neural network model 710-3 with data augmented using the 'Invert' operation, and trains an N-th second neural network model 710-N with data augmented using the 'Rotate' operation.

In this case, the updater 145 updates the data augmentation technique between the plurality of second neural network models 710 for each epoch during the training process. In FIG. 7, for convenience, only the first epoch e1, the second epoch e2, and the k-th epoch ek are illustrated.

As a result, the schedule determinator 150 determines the update schedule derived from the model having the maximum verification accuracy among the derived update schedules as the optimal schedule for the main model.

Figure 8:
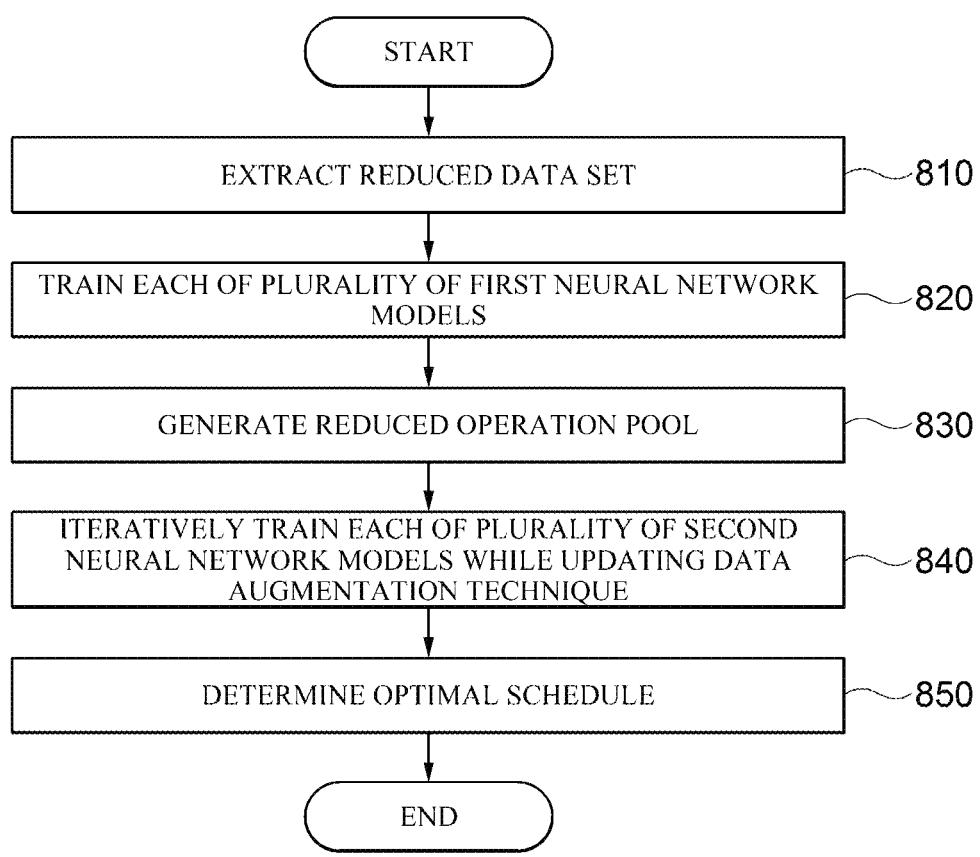
FIG. 8 is a flowchart for describing a method for scheduling data augmentation technique according to an embodiment.

FIG. 8 is a flowchart for describing a method for scheduling a data augmentation technique according to an embodiment.

The method illustrated in FIG. 8 may be performed, for example, by the apparatus 100 for scheduling the data augmentation technique described above.

First, the apparatus 100 for scheduling the data augmentation technique generates a reduced data set by extracting some data from a given training data set based on data distribution of the given training data set (810).

Thereafter, the apparatus 100 for scheduling the data augmentation technique trains each of the plurality of first neural network models reduced from the main model based on a data augmentation technique for each of a given plurality of operations and the generated reduction data set (820).

Thereafter, the apparatus 100 for scheduling the data augmentation technique generates a reduced operation pool by extracting some operations from a plurality of operations based on performance of each of the trained models (830).

Thereafter, the apparatus 100 for scheduling the data augmentation technique trains each of a plurality of second neural network models having the same network structure as the first neural network model based on the data augmentation technique for each operation included in the reduced operation pool and the reduction data set, but performs iterative training while updating the data augmentation technique for each operation included in the reduced operation pool for each preset unit of training based on a training result of each of the plurality of second neural network models (840).

Thereafter, the apparatus 100 for scheduling the data augmentation technique determines any one of the update schedules of the data augmentation technique updated for each preset unit of training as an optimal schedule for the main model based on a final training result of each of the plurality of second neural network models (850).

Figure 9:
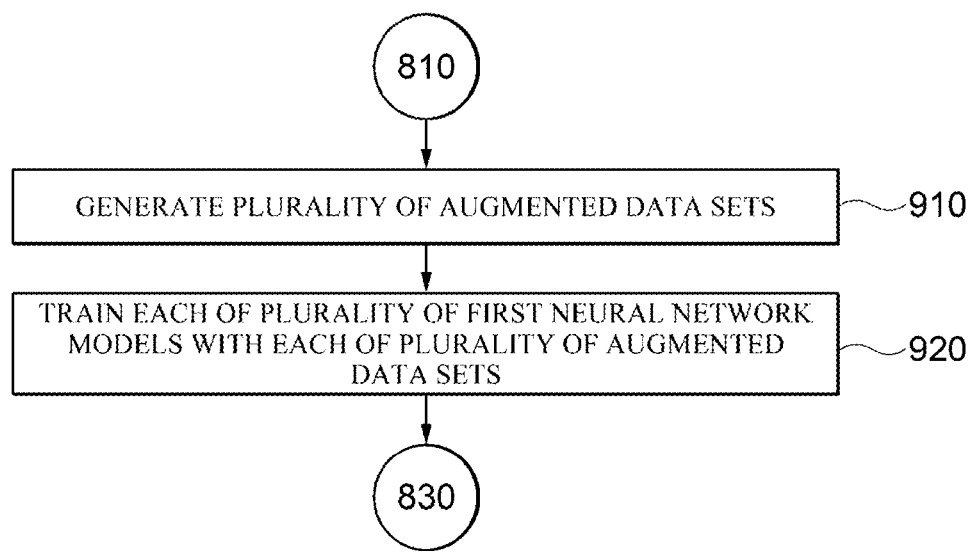
FIG. 9 is a flowchart for describing step 820 in more detail.

FIG. 9 is a flowchart for describing step 820 in more detail.

The method illustrated in FIG. 9 may be performed, for example, by the apparatus 100 for scheduling the data augmentation technique described above.

First, the apparatus 100 for scheduling the data augmentation technique generates a plurality of augmented data sets by applying the data augmentation technique for each of the given plurality of operations to the reduced data set, respectively (910).

Thereafter, the apparatus 100 for scheduling the data augmentation technique trains each of the plurality of first neural network models with each of the generated plurality of augmented data sets (920).

Figure 10:
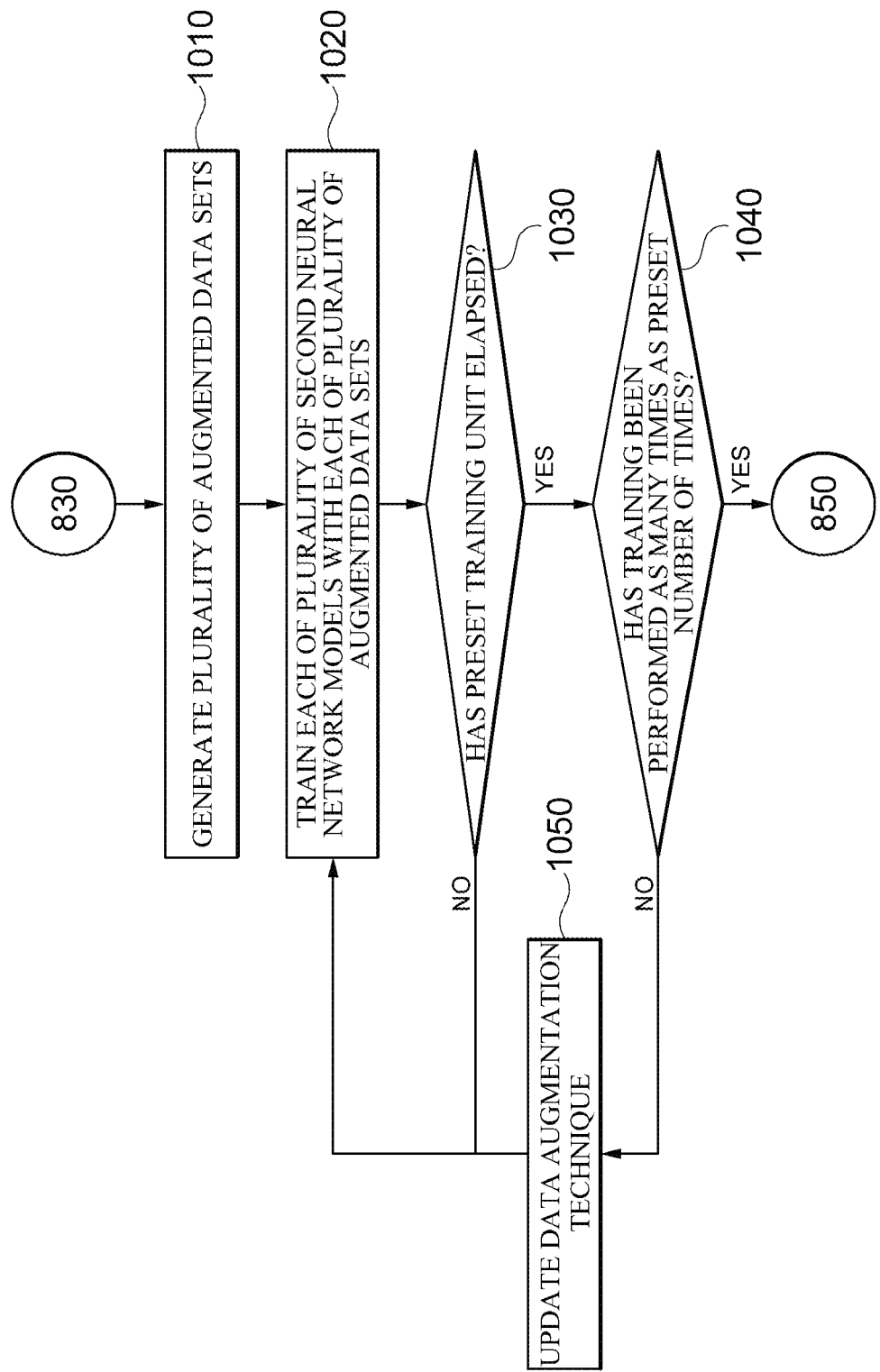
FIG. 10 is a flowchart for describing step 840 in more detail.

FIG. 10 is a flowchart illustrating step 840 in more detail.

The method illustrated in FIG. 10 may be performed, for example, by the apparatus 100 for scheduling the data augmentation technique described above.

First, the apparatus 100 for scheduling the data augmentation technique generates a plurality of augmented data sets by applying a data augmentation technique for each operation included in the reduced operation pool to the reduction data set, respectively (1010).

Thereafter, the apparatus 100 for scheduling the data augmentation technique trains each of the plurality of second neural network models with each of the generated plurality of augmented data sets (1020).

Thereafter, the apparatus 100 for scheduling the data augmentation technique determines, as training is performed, whether or not a preset unit of training has elapsed (1030).

Thereafter, when it is determined that the preset unit of training has elapsed, the apparatus 100 for scheduling the data augmentation technique determines whether or not training has currently been performed as many times as the preset number of times (1040).

Meanwhile, when it is determined that the preset unit of training has not elapsed, the apparatus 100 for scheduling the data augmentation technique continues to perform training on each of the plurality of second neural network models according to the currently applied data augmentation technique.

Thereafter, when it is determined that the training has not currently been performed as many times as the preset number of times, the apparatus 100 for scheduling the data augmentation technique updates the data augmentation technique for each operation included in the reduction operation pool based on the verification accuracy of each of the plurality of second neural network models (1050).

Meanwhile, when it is determined that the training has been performed as many times as the preset number of times, the apparatus 100 for scheduling data augmentation technique determines an optimal schedule based on the final training results of each of the plurality of second neural network models so far.

Figure 11:
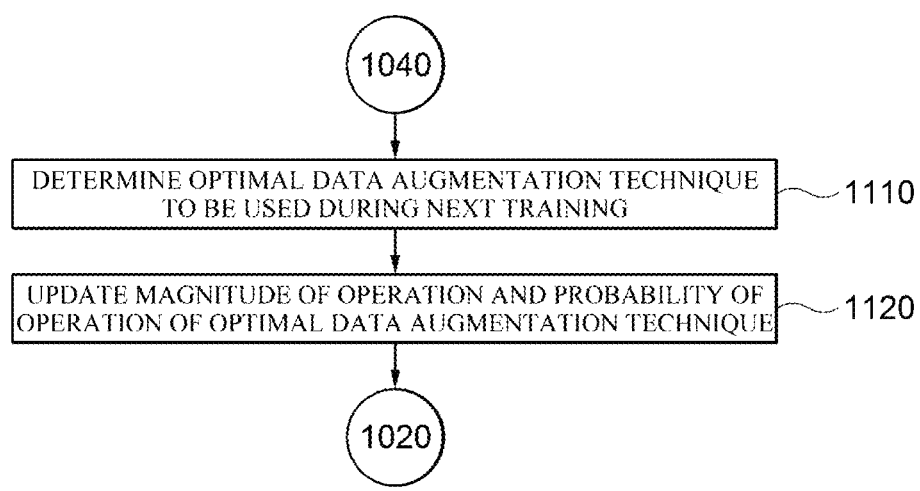
FIG. 11 is a flowchart for describing step 1050 in more detail.

FIG. 11 is a flowchart for describing step 1050 in more detail.

The method illustrated in FIG. 11 may be performed, for example, by the apparatus 100 for scheduling the data augmentation technique described above.

First, the apparatus 100 for scheduling the data augmentation technique compares the verification accuracy of each of the plurality of second neural network models for each preset unit of training, and determines a data augmentation technique applied to the model having the maximum verification accuracy as an optimal data augmentation technique to be used for the remaining models during the next training (1110).

Thereafter, the apparatus 100 for scheduling the data augmentation technique updates the magnitude of the operation and the probability of the operation of the determined optimal data augmentation technique based on the predefined probability density function (1120).

In FIGS. 8 to 11 described above, the method is described by being divided into a plurality of steps, but at least some of the steps may be performed in a different order, performed together by being combined with other steps, omitted, performed by being divided into detailed steps, or performed by being added with one or more steps (not illustrated).

Figure 12:
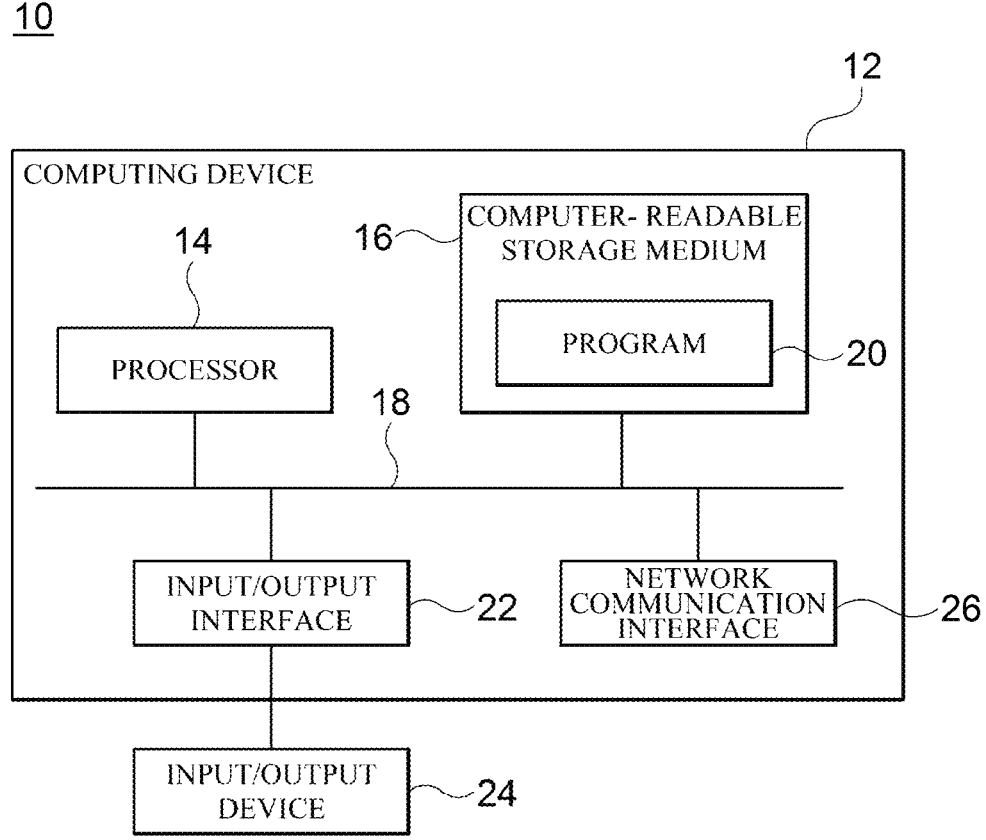
FIG. 12 is a block diagram for illustratively describing a computing environment including a computing device according to an embodiment.

FIG. 12 is a block diagram for illustratively describing a computing environment 10 that includes a computing device according to an embodiment. In the illustrated embodiment, each component may have different functions and capabilities in addition to those described below, and additional components may be included in addition to those described below.

The illustrated computing environment 10 includes a computing device 12. In an embodiment, the computing device 12 may be the apparatus 100 for training the image classification model.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In an embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

According to the disclosed embodiments, the time required for optimization of the data augmentation technique can be reduced by searching for a variable of the data augmentation technique using a reduced data set obtained by extracting a part of the training data.

Also, according to the disclosed embodiments, the time required for optimizing the data augmentation technique can be further reduced by searching for a variable of the data augmentation technique using a reduced operation pool obtained by extracting given some operations.

Also, according to disclosed embodiments, a variable of the data augmentation technique can be set in a direction in which the performance of a neural network model to be trained is improved by searching for a variable of the data augmentation technique according to a predefined probability density function.

Meanwhile, the embodiment of the present invention may include a program for performing the methods described in this specification on a computer, and a computer-readable recording medium containing the program. The computer-readable recording medium may contain program instructions, local data files, local data structures, etc., alone or in combination. The computer-readable recording medium may be specially designed and configured for the present invention, or may be commonly used in the field of computer software. Examples of computer-readable recording media include magnetic media such as a hard disk, a floppy disk, and a magnetic tape, optical recording media such as a CD-ROM and a DVD, and hardware devices such as a ROM, a RAM, a flash memory, etc., that are specially configured to store and execute program instructions are included. Examples of the program may include a high-level language code that can be executed by a computer using an interpreter, etc., as well as a machine language code generated by a compiler.

Although the present invention has been described in detail through representative examples above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. An apparatus for scheduling a data augmentation technique, the apparatus comprising:
   at least one memory configured to store thereon computer program code; and
   at least one processor configured to access the at least one memory and operate according to the computer program code, wherein the computer program code causes the at least one processor to perform:
   generating a reduced data set by extracting data from a given training data set based on a data distribution of the given training data set;
   training each of a plurality of first neural network models, reduced from a main model, based on a data augmentation technique for each of a given plurality of operations and the reduced data set;
   generating a reduced operation pool by extracting operations from the given plurality of operations based on each respective performance of each of the trained plurality of first neural network models;
   training each of a plurality of second neural network models, each of which having the same network structure as a corresponding first neural network model among the plurality of first neural network models, based on a data augmentation technique for each operation included in the reduced operation pool and the reduced data set, and performing iterative training comprising multiple preset units of training while updating, for each preset unit of training, the data augmentation technique for each operation included in the reduced operation pool based on a training result of each of the plurality of second neural network models; and
   determining an update schedule, from a plurality of update schedules respectively corresponding to updates of the data augmentation technique for the multiple preset units of training, as an optimal schedule for the main model based on a final training result of each of the plurality of second neural network models.

2. The apparatus of claim 1, wherein the generating the reduced data set comprises generating the reduced data set based on a ratio of data for each class constituting the given training data set.

3. The apparatus of claim 1, wherein the training each of the plurality of first neural network models comprises:
   generating a plurality of augmented data sets by applying the data augmentation technique for each of the given plurality of operations to the reduced data set, respectively; and
   respectively training each of the plurality of first neural network models with its corresponding augmented data set each of the generated plurality of augmented data sets.

4. The apparatus of claim 3, wherein the applying the data augmentation technique comprises applying the data augmentation technique for each of the given plurality of operations in which a magnitude of the operation and a probability of the operation are randomly updated, for each preset unit of training, to the reduced data set, respectively.

5. The apparatus of claim 1, wherein the generating the reduced operation pool comprises identifying first neural network models having a verification accuracy equal to or greater than a threshold value among the trained plurality of first neural network models, and extracting an operation of a data augmentation technique, applied when training each of the identified first neural network models, from the given plurality of operations.

6. The apparatus of claim 1, wherein the training each of the plurality of second neural network models comprises:
   generating a plurality of augmented data sets by applying the data augmentation technique for each operation included in the reduced operation pool to the reduced data set, respectively;
   respectively training each of the plurality of second neural network models with its corresponding augmented data set of the generated plurality of augmented data sets until being subjected to the multiple preset units of training; and
   updating, for the each preset unit of training, the data augmentation technique for each operation included in the reduced operation pool, based on a verification accuracy of each of the plurality of second neural network models until being subjected to the multiple preset units of training.

7. The apparatus of claim 6, wherein the updating the data augmentation technique for each operation included in the reduced operation pool based on the verification accuracy comprises:
   comparing, for the each preset unit of training, verification accuracies of the plurality of second neural network models, and determining a data augmentation technique, applied to a model having a maximum verification accuracy, as an optimal data augmentation technique to be used for remaining models during next training; and updating a magnitude of the operation and a probability of the operation of the determined optimal data augmentation technique based on a predefined probability density function.

8. The apparatus of claim 1, wherein the determining comprises comparing verification accuracies of the plurality of second neural network models trained for the multiple preset units and determining, as the optimal schedule, an update schedule for a data augmentation technique applied to a model having a maximum verification accuracy.

9. The apparatus of claim 8, wherein the optimal schedule is an update schedule including an operation of the data augmentation technique, applied in the each preset unit of training, to the model having the maximum verification accuracy, a magnitude of the operation, and a probability of the operation.

10. A method for scheduling a data augmentation technique, comprising:

generating a reduced data set by extracting data from a given training data set based on a data distribution of the given training data set;

training each of a plurality of first neural network models, reduced from a main model, based on a data augmentation technique for each of a given plurality of operations and the reduced data set;

generating a reduced operation pool by extracting operations from the given plurality of operations based on each respective performance of each of the trained plurality of first neural network models;

training each of a plurality of second neural network models, each of which having the same network structure as a corresponding first neural network model among the plurality of first neural network models, based on a data augmentation technique for each operation included in the reduced operation pool and the reduced data set, and performing iterative training comprising multiple preset units of training while updating, for each preset unit of training, the data augmentation technique for each operation included in the reduced operation pool based on a training result of each of the plurality of second neural network models; and determining an update schedule, from a plurality of update schedules respectively corresponding to updates of the data augmentation technique for the multiple preset units of training, as an optimal schedule for the main model based on a final training result of each of the plurality of second neural network models.

11. The method of claim 10, wherein, in generating the reduced data set, the reduced data set is generated based on a ratio of data for each class constituting the given training data set.

12. The method of claim 10, wherein the training the each of the plurality of first neural network models comprises:

generating a plurality of augmented data sets by applying the data augmentation technique for each of the given plurality of operations to the reduced data set, respectively; and respectively training each of the plurality of first neural network models with its corresponding augmented data set of the generated plurality of augmented data sets.

13. The method of claim 12, wherein, in generating the plurality of augmented data sets, the data augmentation technique for each of the given plurality of operations in which a magnitude of the operation and a probability of the operation are randomly updated, for each preset unit of training, is applied to the reduced data set, respectively.

14. The method of claim 10, wherein, in generating the reduced operation pool, first neural network models having a verification accuracy equal to or greater than a threshold value among the trained plurality of first neural network models are identified, and an operation of a data augmentation technique, applied when training each of the identified first neural network models, is extracted from the given plurality of operations.

15. The method of claim 10, wherein the performing the iterative training comprises:

generating a plurality of augmented data sets by applying the data augmentation technique for each operation included in the reduced operation pool to the reduced data set, respectively;

respectively training each of the plurality of second neural network models with its corresponding augmented data set of the generated plurality of augmented data sets;

updating, for the each preset unit of training, the data augmentation technique for each operation included in the reduced operation pool based on a verification accuracy of each of the plurality of second neural network models; and the training each of the plurality of second neural network models and the updating may be iteratively performed until being subjected to the multiple preset units of training.

16. The method of claim 15, wherein the updating the data augmentation technique for each operation included in the reduced operation pool comprises:

comparing, for the each preset unit of training, verification accuracies of the plurality of second neural network models, and determining a data augmentation technique, applied to a model having a maximum verification accuracy, as an optimal data augmentation technique to be used for remaining models during next training; and updating a magnitude of the operation and a probability of the operation of the determined optimal data augmentation technique based on a predefined probability density function.

17. The method of claim 10, wherein, in determining the optimal schedule, verification accuracies of the plurality of second neural network models trained for the multiple preset units are compared, and an update schedule for a data augmentation technique, applied to a model having a maximum verification accuracy, is determined as the optimal schedule.

18. The method of claim 17, wherein the optimal schedule is an update schedule including an operation of the data augmentation technique applied, in the each preset unit of training, to the model having the maximum verification accuracy, a magnitude of the operation, and a probability of the operation.

* * * * *